United States Patent [19]
Shirayanagi et al.

[11] Patent Number: 5,966,239
[45] Date of Patent: *Oct. 12, 1999

[54] BINOCULAR MAGNIFYING GLASSES

[75] Inventors: Moriyasu Shirayanagi; Tomohiko Kanzaki, both of Tokyo, Japan

[73] Assignee: Asahi Kogaku Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/805,923

[22] Filed: Feb. 25, 1997

Related U.S. Application Data

[63] Continuation of application No. 08/363,816, Dec. 27, 1994, abandoned.

[30] Foreign Application Priority Data

Dec. 28, 1993 [JP] Japan ................................ 5-350959

[51] Int. Cl.$^6$ ............................ G02B 25/00; G02B 23/00
[52] U.S. Cl. ........................ 359/481; 359/409; 359/411
[58] Field of Search .................................. 359/362–363, 359/377–387, 407–428, 480–482; 351/41, 53, 158, 205

[56] References Cited

U.S. PATENT DOCUMENTS

| | | | |
|---|---|---|---|
| 701,788 | 6/1902 | Berger | 359/481 |
| 1,033,965 | 7/1912 | Troppman | 359/481 |
| 3,899,244 | 8/1975 | Mulder | 359/481 |
| 4,217,025 | 8/1980 | Takenaka | 359/480 |
| 4,886,340 | 12/1989 | Kanda | 359/411 |
| 4,892,384 | 1/1990 | Okamoto | 359/480 |
| 5,074,650 | 12/1991 | Yamagishi et al. | 359/377 |

FOREIGN PATENT DOCUMENTS

| | | | |
|---|---|---|---|
| 2-38931 | 9/1990 | Japan . | |
| 6-95011 | 4/1994 | Japan | 359/481 |
| 1010249 | 11/1965 | United Kingdom | 359/481 |

*Primary Examiner*—Thong Nguyen
*Attorney, Agent, or Firm*—Greenblum & Bernstein, P.L.C.

[57] ABSTRACT

Binocular magnifying glasses include a pair of magnifying optical systems, one system for each of the left and right eyes. Each optical system has an objective lens having a positive power and an eyepiece having a negative power arranged in that order from the object side in. The optical center of at least one eyepiece is positioned outside of a line connecting the center of rotation of the eye and the object point.

19 Claims, 5 Drawing Sheets

BINOCULAR MAGNIFYING GLASSES

This application is a continuation of application Ser. No. 08/363,816, filed Dec. 27, 1994, now abandoned.

BACKGROUND OF THE INVENTION

1. Field of the Invention

The present invention relates to binocular magnifying glasses which are worn for examining an object in a magnified manner when performing precision work by hand, etc.

2. Description of the Related Art

In conventional binocular magnifying glasses of this type, there has been known the technology disclosed in Japanese Examined Patent Publication (Kokoku) No. 2-38933. The binocular magnifying glasses described therein are comprised of a pair of magnifying optical systems, each consisting of an objective lens having a positive power and an eyepiece having a negative power arranged in that order from the object sides one system for each of the right and left eye. The distance between the objective lens and the eyepiece is adjustable depending on conditions of the wearer's eye and the distance of the object. Further, the distance between the optical centers of the objective lenses and the distance between the optical centers of the eyepieces could be independently adjusted.

In these binocular magnifying glasses, it is possible to adjust the position of the lenses so as to match the optical centers of the eyepieces and objective lenses with the line connecting the center of rotation of the wearer's eyeballs and the object each time worn. Since it is necessary to adjust four lenses independently in accordance with the distance between the eyes of the wearer, it is difficult to use these binocular magnifying glasses.

Further, to make the interobjective lens distance variable and match it with a wearer with the smallest conceivable interpupillary distance, it is necessary to make the diameters of the objective lenses relatively small to enable their being adjusted close together. This is one of the major restrictions in securing a broad field of vision in binocular magnifying glasses.

Further, the convergence of the eyes when using the binocular magnifying glasses is stronger than the convergence of the eyes without the binocular magnifying glasses and so it is difficult to obtain a balance between convergence and recommendation. The wearer is therefore not able to withstand long-term use.

SUMMARY OF THE INVENTION

It is therefore an object of the present invention to provide binocular magnifying glasses with a wide field of vision and a balance between accommodation and convergence of the eyes.

In order to achieve the object of the present invention, there is provided binocular magnifying glasses comprising a pair of magnifying optical systems, one system for each of the left and right eyes. Each system comprises: an objective lens having a positive power and an eyepiece having a negative power arranged in that order from the object side in. The optical center of at least each eyepiece being deviated outside from the line connecting the center of rotation of the eye-and the object point.

Optionally, the optical centers of each objective lens in each magnifying optical system may also be deviated from the line connecting the canter of rotation of each eye of the user and the objective point in the direction away from the optical center of the other eyepiece.

Further optionally, the deviation of the optical center of the eyepiece of each optical system from the line connecting the center of rotation of the eye and the object point, may be greater than the deviation of the optical center of the objective lens from the same line.

Still optionally, the binocular magnifying glasses may include support plates for holding constant the distance between the objective lenses of the magnifying optical systems and a slide for changing the distance between the two eyepieces of the magnifying optical systems.

Still further optionally, a provision may be made to arrange each eyepiece so that its optical center is deviated outside the center of its outside diameter.

According to another feature of the invention, there is provided a pair of binocular magnifying glasses comprising a pair of magnifying optical systems, one system for each of the left and right eyes. Each system comprises: an objective lens having a positive power and an eyepiece having a negative power arranged In that order from the object side in. The optical center of each eyepiece of the magnifying optical systems is deviated to the outside from the center of the outer diameter of the eyepiece.

Further optionally, the binocular magnifying glasses may provide for the ratio of the effective diameter of the eyepiece in the horizontal direction to the effective diameter of the eyepiece in the vertical direction to be greater than the ratio of the effective diameter of the objective lens in the horizontal direction to the effective diameter of the objective lens in the vertical direction.

Still further optionally, the objective lenses and the eyepieces of the binocular magnifying glasses explained above may be comprised of a single or several lenses.

DESCRIPTION OF THE PREFERRED EMBODIMENTS

The present invention will be described below with reference to the embodiments shown in the drawings.

Figure 1:
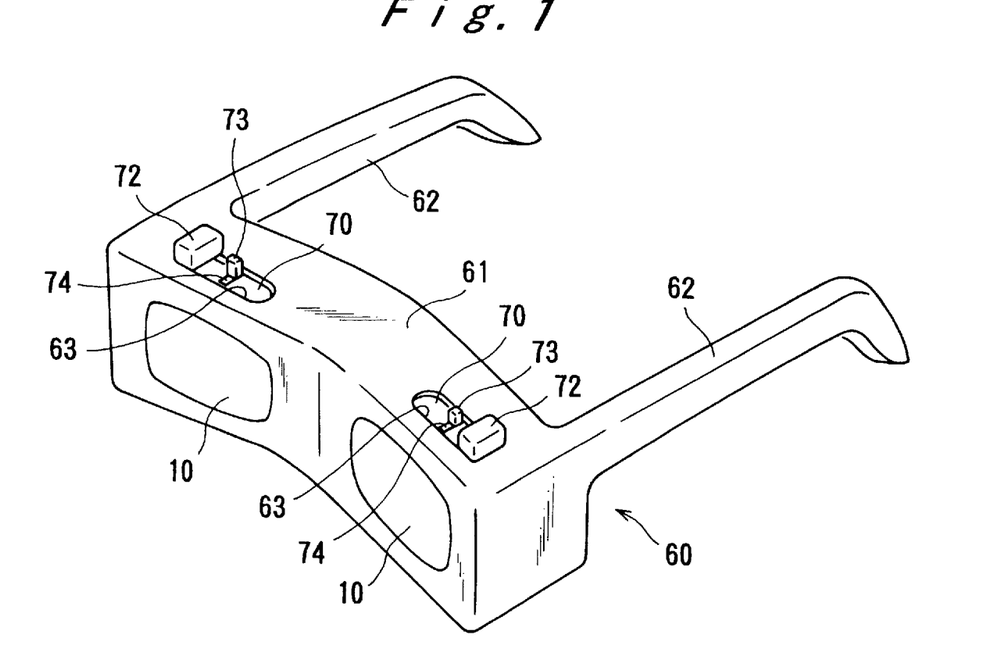
FIG. 1 is a perspective view showing an external view of binocular magnifying glasses of a first embodiment of the present invention.
Figure 2:
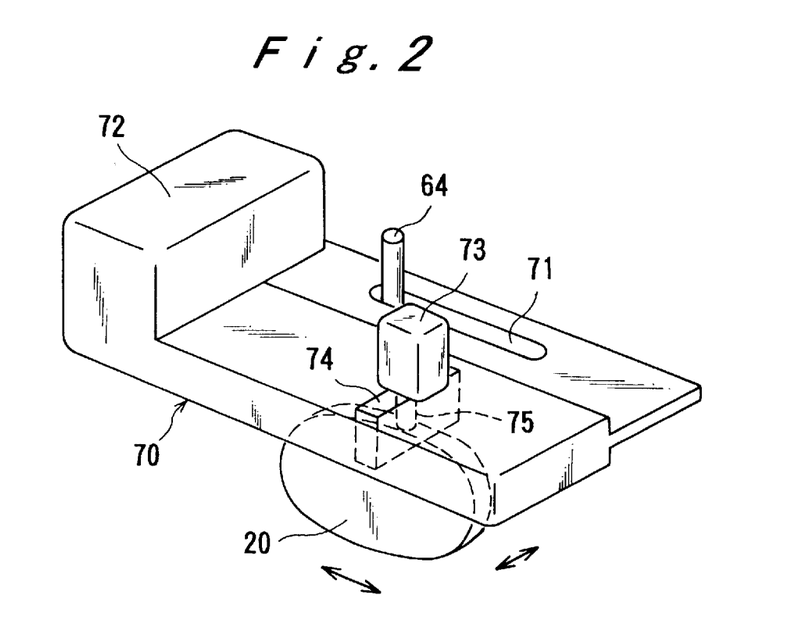
FIG. 2 is an adjusting mechanism mounted in the binocular magnifying glasses shown in FIG. 1.

FIG. 1 is a perspective view showing an external view of binocular magnifying glasses of a first embodiment of the present invention, and FIG. 2 is an adjusting mechanism mounted in the binocular magnifying glasses shown in FIG. 1.

In FIG. 1, a frame 60 has a main body 61 and side pieces 62 connecting each edge of the main body 61. Objective lenses 10 are provided in a front portion of the main body 61, and the distance between the objective lenses 10 is held constant Eyepieces 20 are provided In a rear portion of the main body 61. The eyepieces 20 are movable along slots 63 which are formed in a top plate of the body 61 and extend along the lenses 10 and 20, and the eyepieces 20 are also movable in the width direction of the slots 63. Namely, the distance between the eyepieces 20 can be changed.

Support plates 70 are provided for adjusting the positions of the eyepieces 20. The support plates 70 are housed in the main body 61, and are slidably supported by the main body 61 to move along the slots 63. As shown in FIG. 2, each of the support plates 70 is supported by a support pin 64, which is fixed to the main body 63 and extends through a first slit 71 formed in the support plate 70.

First stems 72 are formed on the support plates 70 to displace the eyepieces 20 along the slots 63, and second stems 73 are slidably supported by second slits 74 formed in the support plates 70 to displace the eyepieces 20 in the direction of the width of the slots 6. As shown in FIG. 2, the second stem 73 is connected to the eyepiece 20 through a pin 75, which is slidably supported by the second slit 74.

Therefore, if the first stems 72 are moved along the slots 63, the distance between the eyepieces 20 is changed, and if the second stems 73 are moved along the second slits 74, the distance between the objective lenses 10 and the eyepieces 20 is changed.

Figure 3:
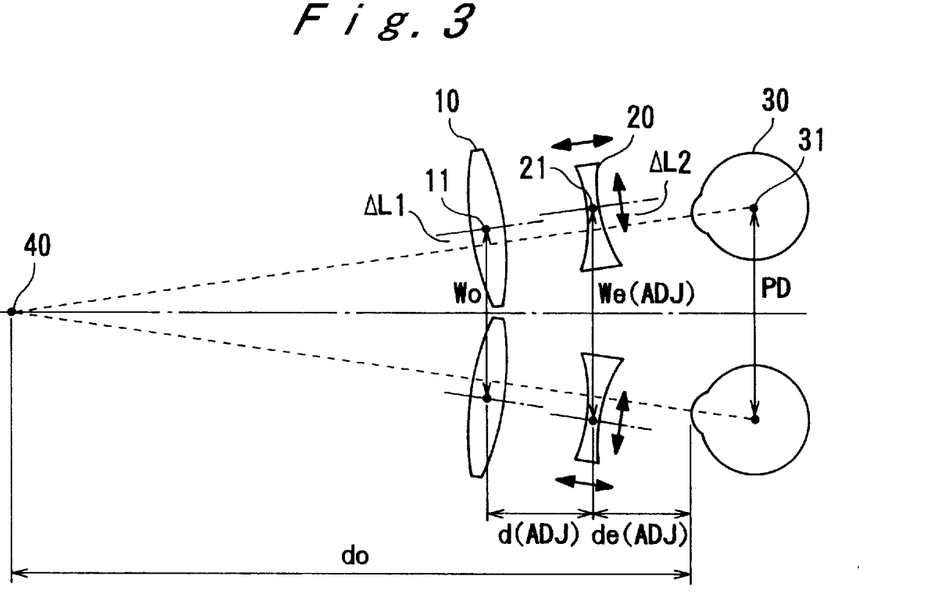
FIG. 3 is a view of the optical configuration of the binocular magnifying glasses of a first and fourth embodiment of the present invention.

FIG. 3 to a view of the optical configuration of the first embodiment of the present invention.

The binocular magnifying glasses of the first embodiment are comprised of a pair of magnifying optical systems, one system for each of the left and right eyes, each consisting of an objective lens 10 with a positive power and an eyepiece 20 with a negative power arranged in that order from the object side. The focal length, fo, of the objective lens 10 is 67.5 mm and the focal length, fe, of the eyepiece 20 is −54.1 mm. Further, the distance d between the objective lens 10 and the eyepiece 20 and the distance, We, between the optical centers of the left and right eyepieces 20 are adjustable. The distance, Wo, between optical centers of the left and right objective lenses 10 is fixed at 53.2 mm.

The relation between the effective diameters of the objective lens and the eyepiece and positions of the optical centers of the same in the first embodiment will be explained with reference to FIG. 3.

In these binocular magnifying glasses, it is possible to make the effective diameter of the objective lens 10 a maximum diameter of 52 mm, but if the effective diameter is too large, the increase in the center thickness causes the weight of the binocular magnifying glasses to increase. Therefore, in this embodiment, in consideration of the balance between ensuring a broad field of vision and the restriction of weight, the diameter was made 45 mm. In the case of the objective lens 10, the optical center 11 and center of the outside diameter 12 were made to match to reduce the center thickness.

The effective diameter of the eyepiece 20 is sufficient if it is a size big enough to prevent an eclipse in the examined bundle of rays. If the effective diameter of the eyepiece 20 is excessively large, this invites an increase in the weight of the binocular magnifying glasses and inhibits examination of the surroundings outside of the line of sight.

Unlike the objective lens 10, which is circular, the eyepiece 20 is elongated in the direction in which the eyepieces are aligned so as not to cause an eclipse in the field of vision even when adjusting the position under the above-mentioned examination conditions (see FIG. 3). The length in both vertical directions from the optical center 21 is 10.5 mm and the length to the outside (towards the ears) is made 9.4 mm and the inside (towards the nose) is 13.7 mm. The optical center 21 of the eyepiece deviates to the outside from the geometric center by 2.2 mm. Further, the ratio of the effective diameter of the horizontal direction to the effective diameter of the vertical direction of the eyepiece is 1.1, which is larger than the ratio of the effective diameter, of the horizontal direction to the effective diameter of the vertical direction of the objective lens.

Assume, as a standard wearing state, a person with an interpupillary distance, PD, of 63 mm wearing the magnifying glasses at a position 35 mm in front of his eyes and observing an object 40 at an object distance, do, of 364 mm. If the distance, d, between the objective lenses and the eyepieces is made 30 mm and the distance between optical centers of the eyepieces, We, is made 64.9 mm the magnification is 1.8 power, the image diopter −1D, and the convergence 1 MW.

In this standard wearing state, the optical center 11 of the objective lens and the optical center 21 of the eyepiece both deviate to the outside from the line connecting the center of rotation 31 of the eye 30 of the wearer and the object 40. The deviation, ΔL1, of the objective lens is 1.6 mm and the deviation, ΔL2, of the eyepiece is 5.0 mm. The values of ΔL1 and ΔL2 are given a positive sign to show deviation to the outside of the line and a negative sign to show deviation to the inside.

Similarly, the lens configuration and the image diopter, convergence, and values of actual fields of vision in the case of wearers with interpupillary distances of 56 mm and 70 mm and object distances, do, of 408 to 325 mm are shown in Table 1.

TABLE 1

Focal length of objective lens fo (mm): 67.5
Focal length of eyepiece fe (mm): −54.1
Standard magnification: 1.8
Radius of objective lens from the optical center ho mm:
(vertical, outside, inside) 22.5, −22.5, 22.5, −22.5 (horizontal/vertical ratio 1.00)
Radius of eyepiece from the optical center he (mm):
(vertical, outside, inside) 10.5, −10.5, 9.4, −13.7 (Distance from the geometric center to the
optical center of eyepiece: 2.2, horizontal/vertical ratio 1.10)

| (1) | Object distance do (mm) | 408~364~325 | 408~364~325 | 408~364~325 |
|---|---|---|---|---|
| (2) | Distance between objective lens and eyepiece d (mm) | 26.8~30.0~33.9 | 26.8~30.0~33.9 | 26.8~30.0~33.9 |

TABLE 1-continued

Focal length of objective lens fo (mm): 67.5
Focal length of eyepiece fe (mm): −54.1
Standard magnification: 1.8
Radius of objective lens from the optical center ho mm:
(vertical, outside, inside) 22.5, −22.5, 22.5, −22.5 (horizontal/vertical ratio 1.00)
Radius of eyepiece from the optical center he (mm):
(vertical, outside, inside) 10.5, −10.5, 9.4, −13.7 (Distance from the geometric center to the
optical center of eyepiece: 2.2, horizontal/vertical ratio 1.10)

| (3) | Eye distance de (mm) | 38.2~35.0~31.1 | 38.2~35.0~31.1 | 38.2~35.0~31.1 |
|---|---|---|---|---|
| (4) | Interpupillary distance of wearer PD (mm) | 56.0 | 63.0 | 70.0 |
| (5) | Distance between the optical centers of objective lenses Wo (mm) | 53.2 | 53.2 | 53.2 |
| (6) | Distance between the optical centers of eyepieces We (mm) | 62.5~64.9~67.8 | 62.5~64.9~67.8 | 62.5~64.9~67.8 |
| (7) | Deviation of objective lenses ΔL1 (mm) | 3.8~4.4~5.1 | 0.9~1.6~2.4 | −1.9~−1.1~−0.3 |
| (8) | Deviation of eyepieces ΔL2 (mm) | 6.7~8.0~9.6 | 3.6~5.0~6.5 | 0.5~1.9~3.5 |
| (9) | Image diopter Vi (D) | −1.0~−1.0~−1.0 | −1.0~−1.0~−1.0 | −1.0~−1.0~−1.0 |
| (10) | Convergence Vg (MW) | 1.0~1.0~1.0 | 1.0~1.0~1.0 | 1.0~1.0~1.0 |
| (11) | Field width FW (mm) | 141~121~105 | 134~108~86 | 161~131~106 |
| (12) | Field rate FR (%) | 86~82~77 | 92~95~100 | 70~73~76 |

Figure 5:
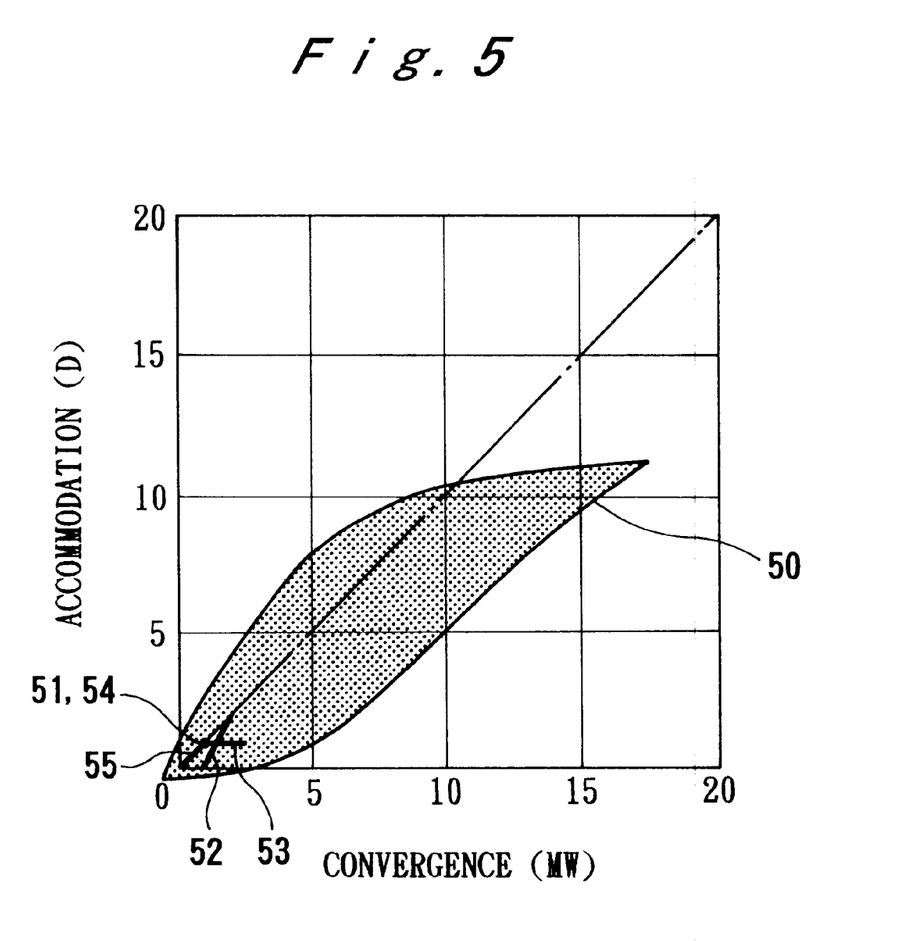
FIG. 5 is a graph of the balance between eye accommodation and convergence according to the binocular magnifying glasses.

FIG. 5 shows that binocular vision is possible when there is accommodation and convergence in the range of the curve 50. For example, in the case of the accommodation 1D, binocular vision is possible with a convergence of 0 MW to 5.2 MW. That is, in binocular vision, the accommodation and convergence operate jointly. If the balance between the two is lost, comfortable binocular vision is not possible. Further, in FIG. 5, if the relationship between convergence and balance is in direct proportion, examination of an object is possible with a balance of accommodation and convergence equal to that experienced by the naked eye The reference number 51 shows that state of the balance between the accommodation and convergence of the eye with respect to the state of wearing of the lenses in the first embodiment. That is, according to this embodiment, as will be understood from the fact that the reference numeral 51 is a single point, it is possible to make a complete match at the accommodation 1 D and convergence 1 MW in all states.

Figure 4:
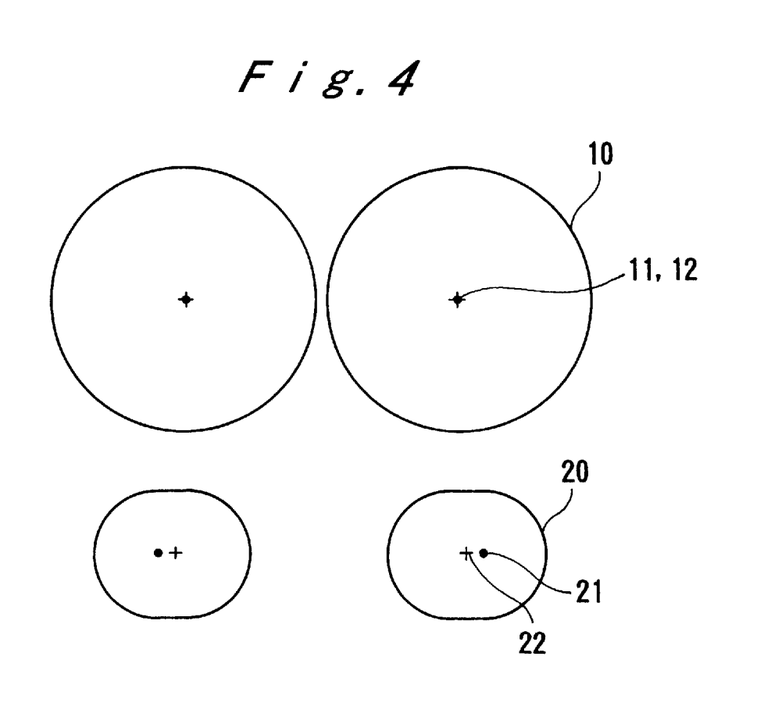
FIG. 4 is a view of the relationship among the effective diameters, centers of outer diameters, and optical centers of the objective lenses and eyepieces of the binocular magnifying glasses of a first embodiment.

Other than the standard viewing state, it is not possible to make the fields of vision of the two eyes completely match, but experiments confirm that no substantial problem exists if the combined field of vision is at least approximately 70 percent of the separate fields of vision of each eye. The combined field of vision in the first embodiment, as shown in FIG. 4, is at least approximately 70 percent in all cases envisioned.

Figure 6:
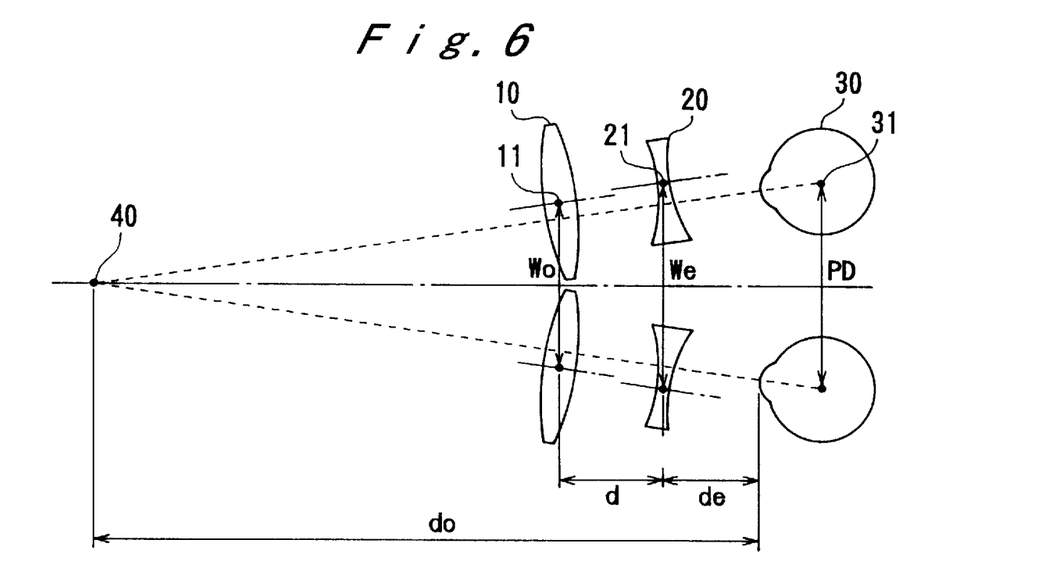
FIG. 6 is a view of the optical configuration of binocular magnifying glasses according to a second embodiment, FIG. 7 in a view of the optical configuration of binocular magnifying grasses according to a third embodiment.

FIG. 6 shows the optical configuration of a second embodiment. The numerical values of the second embodiment are shown in Table 2. The balance between the accommodation and convergence of the eye is shown by the reference numeral 52 in FIG. 5.

In the second embodiment, the focal length, fo, of the objective lens 10 is 67.5 mm, the focal length, fe, of the eyepiece 20 is −54.1 mm, and the standard magnification was 1.8 as in the first embodiment, but the mechanism for adjustment of the distance, d, between the objective lens and the intereyepiece distance, We, is omitted and are set to 30 mm and 63.2 mm, respectively.

With the exception of persons with almost no eye accommodation ability, as may be due to presbyopia, an object at an object distance, do, of 408 to 325 mm can be handled by an eye accommodation ability of 1 to 2D even without adjustment of the interlens distance, d. Further, in the second embodiment, when observing an object at a close distance, the balance tends to be slightly stronger toward convergence rather than accommodation. This tendency is due to a psychological effect.

In the configuration of the second embodiment, since no adjustment is required, the operation is simple and it is possible to provide lightweight binocular magnifying glasses.

Figure 7:
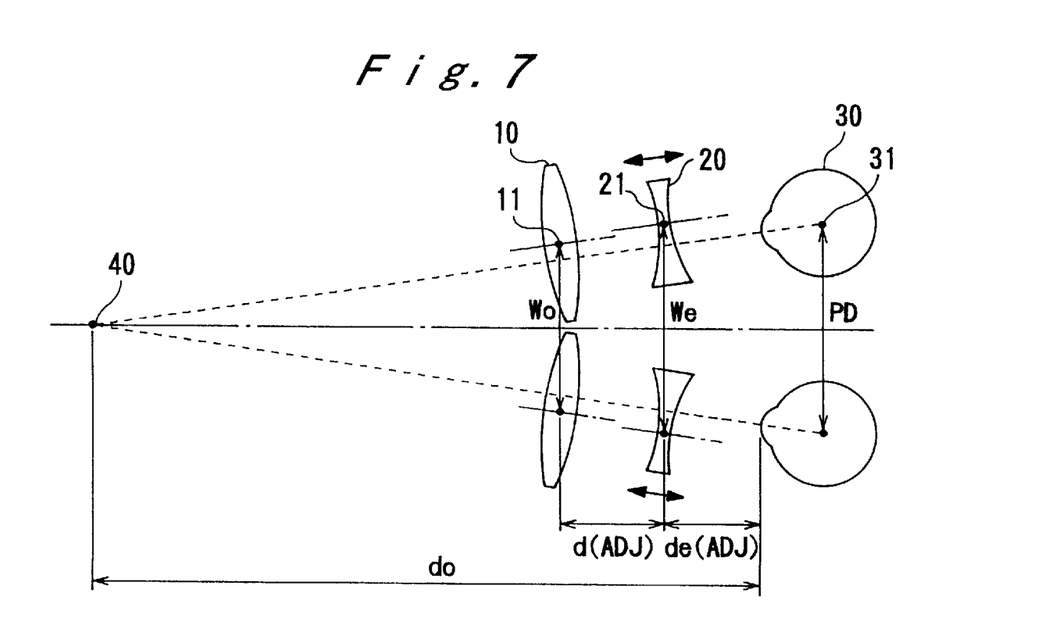

FIG. 7 shows the optical system of a third embodiment. The numerical values of the third embodiment are shown in Table 3.

TABLE 2

Focal length of objective lens fo (mm): 67.5
Focal length of eyepiece fe (mm): −54.1
Standard magnification: 1.8
Radius of objective lens from the optical center ho (mm):
(vertical, outside, inside) 22.5, −22.5, 22.5, −22.5 (horizontal/vertical ratio 1.00)
Radius of eyepiece from the optical center he (mm):
(vertical, outside, inside) 9.6, −9.6, 8.5, −13.1 (Distance from the geometric center to the
optical center of eyepiece: 2.3, horizontal/vertical ratio 1.13)

| (1) | Objective distance do (mm) | 408~364~325 | 408~364~325 | 408~364~325 |
|---|---|---|---|---|
| (2) | Distance between objective lens and eyepiece (mm) | 30.0 | 30.0 | 30.0 |
| (3) | Eye distance de (mm) | 35.0 | 35.0 | 35.0 |
| (4) | Interpupillary distance of wearer PD (mm) | 56.0 | 63.0 | 70.0 |
| (5) | Distance between the optical centers of objective lenses Wo (mm) | 53.2 | 53.2 | 53.2 |
| (6) | Distance between the optical centers of eyepieces We (mm) | 63.5 | 63.2 | 63.2 |

TABLE 2-continued

Focal length of objective lens fo (mm): 67.5
Focal length of eyepiece fe (mm): −54.1
Standard magnification: 1.8
Radius of objective lens from the optical center ho (mm):
(vertical, outside, inside) 22.5, −22.5, 22.5, −22.5 (horizontal/vertical ratio 1.00)
Radius of eyepiece from the optical center he (mm):
(vertical, outside, inside) 9.6, −9.6, 8.5, −13.1 (Distance from the geometric center to the
optical center of eyepiece: 2.3, horizontal/vertical ratio 1.13)

| (7)  | Deviation of objective lenses ΔL1 (mm) | 3.8~4.4~5.1   | 0.9~1.6~2.4   | −1.9~−1.1~−0.3 |
|------|----------------------------------------|---------------|---------------|----------------|
| (8)  | Deviation of eyepieces ΔL2 (mm)        | 6.8~7.2~7.6   | 3.7~4.1~4.6   | 0.6~1.0~1.5    |
| (9)  | Image diopter Vi (D)                   | 0.0~−1.0~−2.0 | 0.0~−1.0~−2.0 | −0.0~−1.0~−2.0 |
| (10) | Convergence Vg (MW)                    | 1.0~1.6~2.1   | 0.9~1.5~2.1   | 0.8~1.5~2.1    |
| (11) | Field width FW (mm)                    | 129~126~123   | 121~103~103   | 148~126~108    |
| (12) | Field rate FR (%)                      | 84~77~71      | 92~100~92     | 67~77~87       |

TABLE 3

Focal length of objective lens fo (mm): 67.5
Focal length of eyepiece fe (mm): −54.1
Standard magnification: 1.8
Radius of objective lens from the optical center ho mm:
(vertical, outside, inside) 22.5, −22.5, 22.5, −22.5 (horizontal/vertical ratio 1.00)
Radius of eyepiece from the optical center he (mm):
(vertical, outside, inside) 10.5, −10.5, 9.1, −14.0 (Distance from the geometric center to the
optical center of eyepiece: 2.4, horizontal/vertical ratio 1.10)

| (1)  | Object distance do (mm)                            | 408~364~325    | 408~364~325    | 408~364~325    |
|------|----------------------------------------------------|----------------|----------------|----------------|
| (2)  | Distance between objective lens and eyepiece (mm)  | 26.8~30.0~33.9 | 26.8~30.0~33.9 | 26.8~30.0~33.9 |
| (3)  | Eye distance de (mm)                               | 38.2~35.0~31.1 | 38.2~35.0~31.1 | 38.2~35.0~31.1 |
| (4)  | Interpupillary distance of wearer PD (mm)          | 56.0           | 63.0           | 70.0           |
| (5)  | Distance between the optical centers of objective lenses Wo (mm) | 53.2 | 53.2 | 53.2 |
| (6)  | Distance between the optical centers of eyepieces We (mm) | 63.2   | 63.2           | 63.2           |
| (7)  | Deviation of objective lenses ΔL1 (mm)             | 3.8~4.4~5.1    | 0.9~1.6~2.4    | −1.9~−1.1~−0.3 |
| (8)  | Deviation of eyepieces ΔL2 (mm)                    | 7.0~7.2~7.2    | 3.9~4.1~4.2    | 0.8~1.0~1.1    |
| (9)  | Image diopter Vi (D)                               | −1.0~−1.0~−1.0 | −1.0~−1.0~−1.0 | −1.0~−1.0~−1.0 |
| (10) | Convergence Vg (MW)                                | 0.8~1.6~2.5    | 0.8~1.5~2.4    | 0.8~1.5~2.2    |
| (11) | Field width FW (mm)                                | 139~126~116    | 137~103~96     | 164~126~95     |
| (12) | Field rate FR (%)                                  | 88~77~64       | 90~100~88      | 68~77~89       |

The balance between the accommodation and convergence of the eye is shown by the reference numeral 53 in FIG. 5.

In the third embodiment, the focal length, fo, of the objective lens 10 is 67.5 mm, the focal length, fe, of the eyepiece 20 is −54.1 mm, and the standard magnification is 1.8 as in the first embodiment, but the mechanism for adjustment of the intereyepiece distance, We, is omitted and this set to 63.2 mm. The interlens distance, d, is adjustable.

The fourth embodiment is an example where the focal length, fo, of the objective lens 10 is 95.8 mm, the focal length, fe, of the eyepiece 20 is −99.7 mm, and the standard magnification is 1.5. The optical configuration is the same as the first embodiment shown in FIG. 3. The interlens distance, d, and the intereyepiece distance, We, are adjustable. The numerical values of the fourth embodiment are shown in Table 4. The balance between accommodation and convergence of the eye is shown by the reference numeral 54 in FIG. 5.

Figure 8:
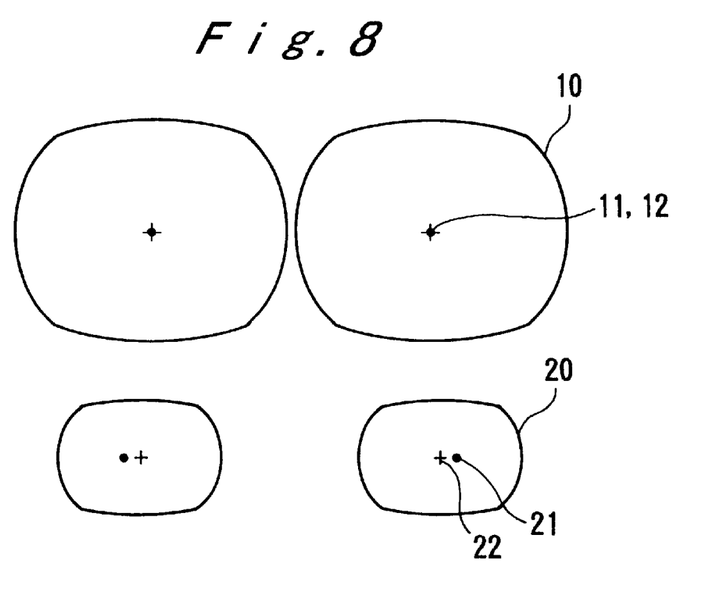
FIG. 8 is a view of the relationship among the effective diameters, centers of outer diameters, and optical centers of the objective lenses and eyepieces of the binocular magnifying glasses of a fourth embodiment.

In the fourth embodiment, due to the design of the magnifying glasses, the objective lens is not made circular. Instead, the top and bottom are cut to give a ratio of the effective diameter in the horizontal direction to the effective diameter in the vertical direction of 1.25, and the eyepiece 20 is made longer in the horizontal direction to give a ratio of horizontal-to-vertical effective diameters of 1.31.

TABLE 4

Focal length of objective lens fo (mm): 95.8
Focal length of eyepiece fe (mm): −99.7
Standard magnification: 1.5
Radius of objective lens from the optical center ho mm:
(vertical, outside, inside) 20.3, −20.3, 25.4, −25.4 (horizontal/vertical ratio 1.25)
Radius of eyepiece from the optical center he (mm):
(vertical, outside, inside) 13.1, −13.1, 13.3, −21.0 (Distance from the geometric center to the
optical center of eyepiece: 3.9, horizontal/vertical ratio 1.31)

| (1) | Object distance do (mm)                           | 432~364~311    | 432~364~311    | 432~364~311    |
|-----|---------------------------------------------------|----------------|----------------|----------------|
| (2) | Distance between objective lens and eyepiece (mm) | 18.4~30.0~45.9 | 18.4~30.0~45.9 | 18.4~30.0~45.9 |

TABLE 4-continued

Focal length of objective lens fo (mm): 95.8
Focal length of eyepiece fe (mm): -99.7
Standard magnification: 1.5
Radius of objective lens from the optical center ho mm:
(vertical, outside, inside) 20.3, -20.3, 25.4, -25.4 (horizontal/vertical ratio 1.25)
Radius of eyepiece from the optical center he (mm):
(vertical, outside, inside) 13.1, -13.1, 13.3, -21.0 (Distance from the geometric center to the
optical center of eyepiece: 3.9, horizontal/vertical ratio 1.31)

| (3) | Eye distance de (mm) | 46.6~35.0~19.1 | 46.6~35.0~19.1 | 46.6~35.0~19.1 |
|---|---|---|---|---|
| (4) | Interpupillary distance of wearer PD (mm) | 56.0 | 63.0 | 70.0 |
| (5) | Distance between the optical centers of objective lenses Wo (mm) | 53.2 | 53.2 | 53.2 |
| (6) | Distance between the optical centers of eyepieces We (mm) | 64.5~70.3~78.2 | 64.5~70.3~78.2 | 64.5~70.3~78.2 |
| (7) | Deviation of objective lenses ΔL1 (mm) | 3.5~4.4~5.3 | 0.6~1.6~2.7 | -2.3~-1.1~0.0 |
| (8) | Deviation of eyepieces ΔL2 (mm) | 8.0~10.7~13.9 | 4.9~7.6~10.7 | 1.9~4.6~7.6 |
| (9) | Image diopter Vi (D) | -1.0~-1.0~-1.0 | -1.0~-1.0~-1.0 | -1.0~-1.0~-1.0 |
| (10) | Convergence Vg (MW) | 1.0~1.0~1.0 | 1.0~1.0~1.0 | 1.0~1.0~1.0 |
| (11) | Field width FW (mm) | 234~177~145 | 236~162~123 | 269~188~131 |
| (12) | Field rate FR (%) | 93~87~75 | 92~96~94 | 77~80~87 |

The relationship between the effective diameters and positions of optical centers of the objective lenses and eyepieces in the fourth embodiment is shown in FIG. 8.

Figure 9:
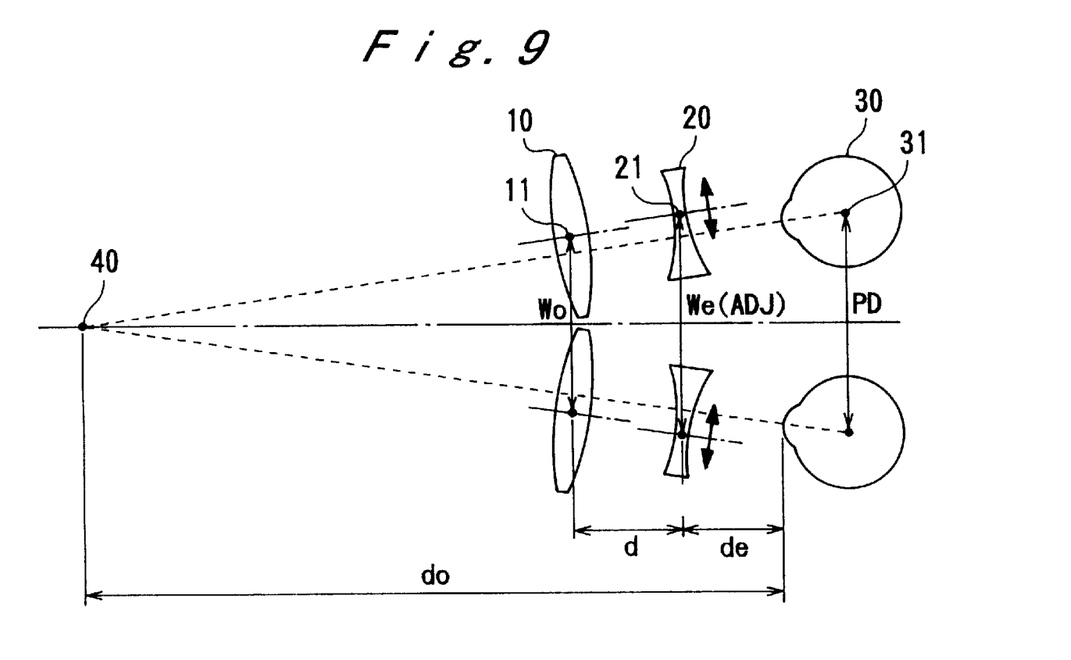
FIG. 9 is a view of the optical configuration of binocular magnifying glasses according to a fifth embodiment.

FIG. 9 shows the optical system of a fifth embodiment. The numerical values of the fifth embodiment are shown in Table 5. The balance between accommodation and convergence of the eye is shown by the reference numeral 55 in FIG. 5.

In the fifth embodiment, the focal length, fo, of the objective lens 10 is 95.8 mm, the focal length, fe, of the eyepiece 20 is -99.7 mm, and the standard magnification is 1.5 as in the fourth embodiment, but the interlens distance, d, is fixed at 30 mm. The intereyepiece distance, We, is adjustable. In this configuration, there is a certain amount of eye accommodation ability. This can also be used by wearers with little tolerance for a lack of matching accommodation and convergence.

While the invention has been described by reference to the specific embodiments chosen for purposes of illustration, it should be apparent that numerous modifications could be made thereto by those skilled in the art without departing from the basic concept and scope of the invention.

TABLE 5

Focal length of objective lens fo (mm): 95.8
Focal length of eyepiece fe (mm): -99.7
Standard magnification: 1.5
Radius of objective lens from the optical center ho mm:
(vertical, outside, inside) 25.4, -25.4, 25.4, -25.4 (horizontal/vertical ratio 1.00)
Radius of eyepiece from the optical center he (mm):
(vertical, outside, inside) 12.2, -12.2, 8.6, -19.7 (Distance from the geometric center to the
optical center of eyepiece: 5.6, horizontal/vertical ratio 1.16)

| (1) | Object distance do (mm) | 432~364~311 | 432~364~311 | 432~364~311 |
|---|---|---|---|---|
| (2) | Distance between objective lens and eyepiece (mm) | 30.0 | 30.0 | 30.0 |
| (3) | Eye distance de (mm) | 35.0 | 35.0 | 35.0 |
| (4) | Interpupillary distance of wearer PD (mm) | 56.0 | 63.0 | 70.0 |
| (5) | Distance between the optical centers of objective lenses Wo (mm) | 53.2 | 53.2 | 53.2 |
| (6) | Distance between the optical centers of eyepieces We (mm) | 72.0~70.3~68.4 | 72.0~70.3~68.4 | 72.0~70.3~68.4 |
| (7) | Deviation of objective lenses ΔL1 (mm) | 3.5~4.4~5.3 | 0.6~1.6~2.7 | -2.3~-1.1~0.0 |
| (8) | Deviation of eyepieces ΔL2 (mm) | 11.0~10.7~10.3 | 7.9~7.6~7.4 | 4.8~4.6~4.4 |
| (9) | Image diopter Vi (D) | 0.0~-1.0~-2.0 | 0.0~-1.0~-2.0 | 0.0~-1.0~-2.0 |
| (10) | Convergence Vg (MW) | 0.0~1.0~2.0 | 0.0~1.0~2.0 | 0.0~1.0~2.0 |
| (11) | Field width FW (mm) | 188~177~168 | 206~162~147 | 238~188~151 |
| (12) | Field rate FR (%) | 96~87~78 | 86~96~94 | 68~80~91 |

We claim:

1. Binocular magnifying glasses, comprising:
a pair of magnifying optical systems, one magnifying optical system for a left eye and one magnifying optical system for a right eye, each magnifying optical system comprising:
an objective lens having a positive power, and an eyepiece having a negative power, arranged in this order from an object side, wherein
an optical center of each objective lens and an optical center of each eyepiece both optically deviate outside of a line connecting a center of rotation of each eye of a user and an objective point, a distance between said optical centers of said eyepieces being fixed.

2. The binocular magnifying glasses of claim 1, wherein said optical center of each objective lens deviates from a line connecting the center of rotation of each eye and said objective point, in a direction away from an optical center of an other objective lens.

3. The binocular magnifying glasses of claim 2, wherein a deviation of said optical center of said eyepiece from said line is greater than a deviation of said optical center of said objective lens from said line.

4. The binocular magnifying glasses of claim 1, wherein each said eyepiece is arranged so that said optical center of each said eyepiece is deviated from said line connecting said center of rotation of each said eye and said objective point in a direction away from said optical center of the other said eyepiece.

5. The binocular magnifying glasses of claim 1, wherein a distance between said optical centers of said objective lenses is fixed.

6. The binocular magnifying glasses of claim 1, wherein a ratio of an effective diameter of said eyepiece in a horizontal direction to an effective diameter in a vertical direction is made larger than a ratio of an effective diameter of said objective lens in a horizontal direction to an effective diameter of said objective lens in a vertical direction.

7. A magnifying glass comprising:
   a pair of objective lenses; and
   a pair of eyepieces, wherein an optical center of each objective lens of said pair of objective lenses and an optical center of each eyepiece of said pair of eyepieces are both optically offset outside of a line connecting a center of rotation of each eye of a user and an objective point, further comprising a moving mechanism mounting each said eyepiece for movement so that a position of said optical center of each eyepiece is adjustable outside of said line.

8. The magnifying glass of claim 7, wherein said magnifying glass comprises a binocular.

9. The magnifying glass of claim 7, wherein said objective lens has a positive power.

10. The magnifying glass of claim 9, wherein said eyepiece has a negative power.

11. Binocular magnifying glasses, comprising:
    a pair of magnifying optical systems, one magnifying optical system for a left eye and one magnifying optical system for a right eye, each magnifying optical system comprising:
    an objective lens having a positive power, and an eyepiece having a negative power, arranged in this order from an object side, wherein
    an optical center of each objective lens and an optical center of each eyepiece both deviate outside of a line connecting a center of rotation of each eye of a user and an objective point, a distance between said optical centers of said eyepieces being adjustable.

12. The binocular magnifying glasses of claim 11, wherein an optical center of an objective lens deviates from said line connecting the center of rotation of each eye and said objective point, in a direction away from an optical center of another objective lens.

13. The binocular magnifying glasses according to claim 12, wherein a deviation of the optical center of said eyepiece from said line is greater than a deviation of the optical center of said objective lens from said line.

14. The binocular magnifying glasses according to claim 11, further comprising:
    a system that maintains a constant distance between said objective lenses of said magnifying optical systems; and
    a system that changes a distance between said eyepieces of said magnifying optical systems.

15. The binocular magnifying glasses according to claim 11, wherein each eyepiece is arranged so that an optical center of each said eyepiece is deviated from said line connecting said center of rotation of each said eye and said objective point, in a direction away from an optical center of the other eyepiece.

16. The binocular magnifying glasses according to claim 11, wherein a distance between said optical centers of said objective lenses is fixed.

17. Binocular magnifying glasses, comprising:
    a pair of magnifying optical systems, one magnifying optical system for each eye of a user, each magnifying optical system comprising:
    an objective lens having a positive power, and an eyepiece lens having a negative power, arranged in this order from an object side, wherein
    an optical center of each objective lens and an optical center of each eyepiece lens both optically deviate outside of a line connecting a center of rotation of each eye of the user and an objective point, a distance between said optical centers of said eyepiece lenses being adjustable, and
    wherein a ratio of an effective diameter of said eyepiece lens in a horizontal direction to an effective diameter of said eyepiece lens in a vertical direction is larger than a ratio of an effective diameter of said objective lens in a horizontal direction to an effective diameter of said objective lens in a vertical direction.

18. The binocular magnifying glasses according to claim 17, wherein a distance between optical centers of said objective lenses is fixed.

19. The binocular magnifying glasses according to claim 17, further comprising:
    a system that maintains constant distance between said two objective lenses of said magnifying optical system; and
    a system that changes a distance between said eyepiece lens of each of said magnifying optical systems.

* * * * *